United States Patent Office 3,418,101
Patented Dec. 24, 1968

3,418,101
PROCESS FOR PLANT DESICCATION
Bernard Buchholz, Blue Bell, and Ivan Christoff Popoff,
Ambler, Pa., assignors to Pennsalt Chemicals Corporation, Philadelphia, Pa., a corporation of Pennsylvania
No Drawing. Filed Dec. 15, 1965, Ser. No. 514,124
6 Claims. (Cl. 71—72)

ABSTRACT OF THE DISCLOSURE

A process for desiccating plants by contacting said plants with an aryl vinyl sulfone or structure $$(R_1)_n-Ar-SO_2-C=C-R_2$$
$$\phantom{(R_1)_n-Ar-SO_2-}|\phantom{=}|$$
$$\phantom{(R_1)_n-Ar-SO_2-C}X\phantom{=}X$$

where Ar is aryl containing from 6 to 10 carbon atoms, where $R_1$ is hydrogen, halogen, nitro, amino, or lower alkyl, $R_2$ is hydrogen or $-SO_2-Ar$, X is hydrogen or halogen, and $n$ is a small integer.

---

This invention relates to the use of chemical compounds as plant desiccants. In particular, the invention is concerned with desiccant compositions comprising compounds having the structure $$(R_1)_n-Ar-SO_2-C=C-R_2$$
$$\phantom{(R_1)_n-Ar-SO_2-}|\phantom{=}|$$
$$\phantom{(R_1)_n-Ar-SO_2-C}X\phantom{=}X$$

where Ar is an aromatic group containing 6 to 10 carbon atoms, $R_1$ is selected from the group consisting of hydrogen, halogen, nitro, amino, and lower alkyl, $R_2$ is selected from the group consisting of hydrogen and $$-SO_2-$$

Ar (where Ar is as defined above), X is selected from the group consisting of hydrogen and halogen, and $n$ is a small integer.

The above compounds are active desiccants and plants may be desiccated by applying to their foliage a desiccating amount of a carrier composition containing one or more of the compounds as the active agent. In general, the amount of active agent which will be used will be those rates of application to the plant between 0.05 and about 10.0 pounds per acre, although, of course, higher rates of application may be used and may be preferable for certain types of plants, particularly large woody plants such as trees.

It is to be understood that the term "desiccation" as used in this discussion is meant to include also defoliant activity, since the active agents of the invention function both to desiccate with and without foliar drop. When foliar drop occurs, defoliation is more descriptive of the action, but in any event, both desiccation and defoliation effects are achieved by this invention.

The defoliation of plants and crops is of high economic importance in both agricultural and forestry operations. Defoliation of plants is desirable to increase the value of the crops from such plants, either by hastening maturity of the crop and/or improving the grade of fruit. With cotton plants, defoliation at the proper stage in their life is desirable in order to expose the lower bolls which, in luxuriant plants, are inaccessible to the sunlight which is needed for the ripening process. Defoliation of the cotton plant also enables cotton picking to be made much more efficiently by hand or machine. Defoliation of citrus trees, peach, plum, apple and other fruit trees, as well as other types of trees, is also important in order to remove a certain number of leaves and thereby more or less force the maturity of the plant or its fruit. Likewise, vegetables such as string beans, soy beans and various crop plants are frequently subjected to defoliation in order to make harvesting easier. In like manner, desiccants are frequently used on seed crops to aid in harvesting.

The procedures that will be used to apply the active agents of this invention to trees, vegetables, plants and other crops for desiccation and defoliation purposes, will be in accord with the usual practices. Some of the compounds of the invention have water solubility and will therefore be employed generally in aqueous solution. Where the compounds have limited water solubility, however, they may be employed either as a solution in an organic solvent, or they may be applied to the plant as an aqueous dispersion or emulsion. When an organic system is employed, the organic solvent will generally be of the ketone type, such as acetone, methyl ethyl ketone, cyclohexanone and the like, but other solvent systems may also be used, such as mineral oils, aliphatic amides (e.g., dimethylformamide, dimethylacetamide, etc.), ketoalcohols (e.g., diacetone alcohol), and the like. Aromatic hydrocarbons e.g., xylene, toluene, etc.) are also useful solvents for many of the compounds of the inventions.

The active agent of the invention may be made up as a concentrate which will be manufactured and sold as an article of commerce. Such as concentrate is simply diluted with water just prior to use to form the aqueous solution or dispersion for spraying on the foliage of the plant. A concentrate generally will contain from 5 to about 50% by weight of the agent, the balance being liquid vehicle and surfactant, if the liquid vehicle is non-aqueous such as a hydrocarbon oil. Alternatively, the active agent may be placed on a solid carrier rather than in a liquid carrier, as described above. Solid carriers may be applied directly to the plants by dusting, or they may be in the form of wettable or dispersible powders which likewise may be added to aqueous systems for application by conventional techniques. Concentration of the active agent on the carrier will vary between about 2 and 20% by weight of the total composition.

The active agents used in the invention may be obtained by oxidation of the corresponding sulfide with peracids, inorganic and organic peroxides and hypochlorites as disclosed in U.S. 2,163,180. As indicated the operable desiccants are those having the structure:

$$R_1-Ar-SO_2-C=C-R_2$$
$$\phantom{R_1-Ar-SO_2-}|\phantom{=}|$$
$$\phantom{R_1-Ar-SO_2-C}X\phantom{=}X$$

and $R_1$ will be hydrogen, halogen, $NO_2$, $NH_2$ or a lower alkyl group containing one to four carbon atoms, e.g., methyl, ethyl, propyl, isopropyl, butyl, isobutyl, and tertiary butyl. The $R_1$ group may be ortho, meta or para to the sulfone group, but will preferably be in the para position. The X groups which may be the same or different, will be hydrogen or halogen and the preferred halogen for both $R_1$ and X is chlorine, although iodine, bromine and fluorine are also useful. The $R_2$ group, as indicated will be hydrogen or $SO_2$-aryl. Specific compounds which illustrate the invention include phenyl vinyl sulfone, p-chlorophenyl vinyl sulfone, p-bromophenyl vinyl sulfone, phenyl 1,2-dichlorovinyl sulfone, o-bromophenyl 2-iodovinyl sulfone, p-tolyl vinyl sulfone, p-tert-butylphenyl 1,2-dichlorovinyl sulfone, cis-and trans-1,2-bis(phenylsulfonyl)ethylene β-naphthyl vinyl sulfone, and the like.

In order to further illustrate the invention the following examples are given:

Example 1.—Useful formulations (A) Aqueous formulations.—Ten parts by weight of p-tolyl 1,2-dichlorovinyl sulfone and 90 parts by weight of water are ball milled in the presence of an alkyl arylpolyether alcohol surfactant until a stable dispersion is obtained.

(B) Aqueous dispersion from ketone solution concentrates.—Ten parts by weight of p-chlorophenyl vinyl sulfone was dissolved in 85 parts by weight in acetone and 5 parts by weight of an alkyl arylpolyether alcohol surfactant ("Triton" X–155). This formulation was a clear, homogeneous solution which was stable to storage and useful as an article of commerce. For use, the concentrate is added to a water or oil carrier to give a liquid formulation ready for spraying onto the foliage of plants.

(C) Hydrocarbon concentrate.—Ten parts by weight of p-bromophenyl vinyl sulfone was dissolved in 85 parts of xylene and 5 parts of surfactant ("Triton" X–155) was added. The clear homogeneous liquid was storage stable and ready for use by addition to water to give a sprayable dispersion of the active agent.

(D) Wettable Powder

|   | Percent |
|---|---|
| Phenyl vinyl sulfone | 50 |
| Surfactants: | |
| ("Marasperse" N) | 2 |
| (Igepon) | 2 |
| Attapulgite carrier ("Attaclay") | 46 |

Example 2

Plant response data for the defoliants were obtained by spraying formulations on six to ten months old cotton plants at rates ranging from 1.0 to 5.0 pounds per acre and the plant response effect observed over a three week period. The following Table I indicates the results as expressed in percent abscission and percent desiccation obtained in the number of days shown:

TABLE I.—DESICCANT EFFECTS OF VARIOUS SULFONES

| Compound tested | Rate applied (lbs./A) | Formulation used (see note) | Results obtained |
|---|---|---|---|
| $C_6H_5$—$SO_2$—CH=$CH_2$ | 5 | (a) (a) | 33% defoliation in 14 days. 40% desiccation in 7 days. |
| p-Cl—$C_6H_4$—$SO_2$—CH=$CH_2$ | 1 | (b) | 100% desiccation in 2 days. |
| $C_6H_5$—$SO_2$—C(Cl)=CH(Cl) | 1 | (c) | 20% desiccation in 1 day. |
| $C_6H_5$—$SO_2$—C(Cl)=CH(Cl) | 5 | (d) | 60% desiccation in 1 day. |
| $C_6H_5$—$SO_2$—C(Cl)=CH(Cl) | 5 | (a) | 30% desiccation in 7 days. |
| p-$CH_3$—$C_6H_4$—$SO_2$—CH(Cl)=CH(Cl) | 5 | (d) | 80% desiccation in 3 to 7 days. |
| trans-$C_6H_5$—$SO_2$—CH=CH—$SO_2$—$C_6H_5$ | 5 | (d) | 40 to 90% desiccation in 3 to 7 days. |
| cis-$C_6H_5$—$SO_2$—CH=CH—$SO_2$—$C_6H_5$ | 5 | (d) | 40% desiccation in 4 days. |
| p-Br—$C_6H_4$—$SO_2$—CH=$CH_2$ | 5 | (d) | 100% defoliation in 14 days. |
| p-Br—$C_6H_4$—$SO_2$—CH=$CH_2$ | 1 | (c) | 83% defoliation in 14 days. |
| p-Br—$C_6H_4$—$SO_2$—CH=$CH_2$ | 5 | (d) | 75–80% desiccation in 2 to 3 days. |
| β-naphthyl—$SO_2$—CH=$CH_2$ | 5 | (d) | 40% desiccation in 4 days. |

Note.—(a) An aqueous dispersion of 0.5% by weight of active agent, (b) An aqueous dispersion of 0.1% by weight of active agent, (c) A solution of 0.1% by weight of active agent in a non-phytotoxic oil (Superior spray oil), (d) A solution of 0.5% by weight of active agent in a non-phytotoxic oil (Superior spray oil).

It is of significant interest to note that the above effects are obtained on cotton only when the vinyl sulfone is an aromatic sulfone as defined above. Aliphatic, cycloaliphatic, and even arylalkyl sulfones are inactive on cotton. Thus, for example when evaluated at 5 pounds per acre as in Example 2, the following vinyl sulfones were all found to be inactive:

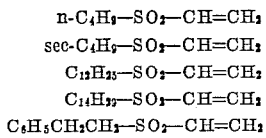

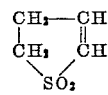

Also of interest is the fact that even when the aryl group is present, but in the vinyl portion of the molecule, no activity is seen. Thus,

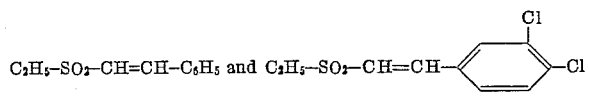

are inactive on cotton at 1 and 5 pounds per acre respectively. Likewise, the following compounds show no desiccation effects on cotton at 5 pounds per acre:

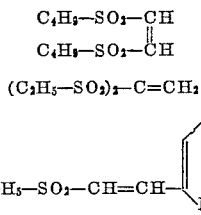

Example 3

Formulations of p-chlorophenyl vinyl sulfone in oil and water as detailed in Example 2 were sprayed on trees at a rate of 5 pounds per acre. The following results were obtained:

| Formulation | Percent/days | | | |
|---|---|---|---|---|
| | Abscission | | Desiccation | |
| Tree species: | Oil | Water | Oil | Water |
| Chinese Elm | 40/21 | 5/28 | 75/2 | 20/5 |
| Norway Maple | 5/5 | | 75/3 | 30/5 |
| English Laurel | 10/21 | | 40/5 | 10/5 |
| Sasa Pigmy | | | 90/5 | 5/1 |
| Euonymus Japonica | | | 10/3 | |

Example 4

An aqueous formulation of phenyl 1,2-dichloro-vinyl sulfone corresponding to that described in Example 3 was sprayed onto various trees at a rate of 5 pounds per acre to give the following results:

| | Percent/days | |
|---|---|---|
| | Abscission | Desiccation |
| Chinese Elm | 35/28 | 75/1 85/3 |
| Norway Maple | 5/28 | 50/2 |
| English Laurel | | 5/7 |
| Sasa Pigmy | | 50/2 |

Examples of other vinyl sulfones operable in this invention are:

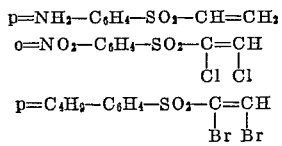

and the like.

It will be understood that changes and variations may be made from the above description of the invention without departing from its spirit and scope.

We claim:

1. The process of desiccating woody plants which comprises contacting the foliage of said plants with a desiccating amount of a compound of structure

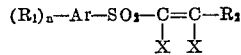

where Ar is selected from the group consisting of phenyl and naphthyl, $R_1$ is selected from the group consisting of hydrogen, halogen, nitro, amino, and lower alkyl, $R_2$ is selected from the group consisting of hydrogen and —$SO_2Ar$, X is selected from the group consisting of hydrogen and halogen, and $n$ is 0 to 4.

2. The process of claim 1 where the active compound is phenyl vinyl sulfone.

3. The process of claim 1 where the active compound is p-chlorophenyl vinyl sulfone.

4. The process of claim 1 where the active compound is phenyl-1,2-dichlorovinyl sulfone.

5. The process of claim 1 where the active compound is p-methylphenyl-1,2-dichlorovinyl sulfone.

6. The process of claim 1 where the active compound is 1,2-bis(phenylsulfonyl)ethylene.

References Cited

UNITED STATES PATENTS

| 2,140,608 | 12/1938 | Ufer | 260—607 |
| 2,163,180 | 6/1939 | Ufer. | |
| 2,634,202 | 4/1953 | Fincke | 260—607 |
| 3,021,370 | 2/1962 | Bluestone | 260—607 |
| 3,144,383 | 8/1964 | Aichenegg et al. | 167—30 |
| 3,227,734 | 1/1966 | Soloway et al. | 260—607 |

LEWIS GOTTS, Primary Examiner.

G. HOLLRAH, Assistant Examiner.

U.S. Cl. X.R.

71—103; 260—294.8, 332.1, 578, 607